(12) United States Patent
Yamaguchi

(10) Patent No.: US 12,485,874 B2
(45) Date of Patent: Dec. 2, 2025

(54) CHARGING CONTROL DEVICE FOR HYBRID ELECTRIC VEHICLE

(71) Applicant: TOYOTA JIDOSHA KABUSHIKI KAISHA, Toyota (JP)

(72) Inventor: Mitsuru Yamaguchi, Ama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 18/469,827

(22) Filed: Sep. 19, 2023

(65) Prior Publication Data
US 2024/0174215 A1   May 30, 2024

(30) Foreign Application Priority Data
Nov. 29, 2022   (JP) .................................. 2022-190803

(51) Int. Cl.
*B60W 20/13* (2016.01)
*B60W 10/06* (2006.01)
*B60W 10/08* (2006.01)
*B60W 10/26* (2006.01)

(52) U.S. Cl.
CPC ............ *B60W 20/13* (2016.01); *B60W 10/06* (2013.01); *B60W 10/08* (2013.01); *B60W 10/26* (2013.01); *B60W 2510/0657* (2013.01); *B60W 2510/081* (2013.01)

(58) Field of Classification Search
CPC ...... B60W 20/13; B60W 10/06; B60W 10/08; B60W 10/26; B60W 2510/0657; B60W 2510/081; B60W 20/00
See application file for complete search history.

(56) References Cited

FOREIGN PATENT DOCUMENTS

| JP | 2007246009 A | * | 9/2007 | ............. Y02T 10/62 |
| JP | 2009-029319 A | | 2/2009 | |

* cited by examiner

*Primary Examiner* — Brian P Sweeney
(74) *Attorney, Agent, or Firm* — SoraIP, Inc.

(57) ABSTRACT

When the remaining charge amount of the battery decreases to a predetermined value or less, the engine torque reduction control unit reduces the torque of the engine such that the operating point of the engine falls within a predetermined engine torque stable region. Then, in a state in which the operating point of the engine is within the engine torque stable region, the torque of the electric motor is controlled by the charging control unit so that the actual charge amount by the electric motor becomes a preset target charge amount. This makes it possible to recover the battery from a state in which the charge amount is insufficient.

7 Claims, 4 Drawing Sheets

CHARGING CONTROL DEVICE FOR HYBRID ELECTRIC VEHICLE

CROSS-REFERENCE TO RELATED APPLICATION

This application claims priority to Japanese Patent Application No. 2022-190803 filed on Nov. 29, 2022, incorporated herein by reference in its entirety.

BACKGROUND

1. Technical Field

The present disclosure relates to a charging control device for a hybrid electric vehicle including an electric motor provided between an engine and a drive wheel, and a battery charged with electric power generated by the electric motor.

2. Description of Related Art

There is known a control device for a hybrid electric vehicle including an electric motor (motor generator) provided between an engine and a drive wheel, and a battery charged with electric power generated by the electric motor. For example, a charging control device for a hybrid electric vehicle described in Japanese Unexamined Patent Application Publication No. 2009-029319 (JP 2009-029319 A) applies to this. In JP 2009-029319 A, in a case where electric power is generated by rotationally driving an electric motor by idle rotation of an engine, the load of a strong electric system such as the electric motor and an inverter is reduced by changing the idle rotation of the engine and the consumption torque of the electric motor according to the charge amount of the battery, and increasing the idle rotational speed of the engine and reducing the consumption torque of the electric motor when the charge amount of the battery is low.

SUMMARY

A battery is charged while maintaining a rotational speed of an electric motor by balancing positive torque of engine torque with negative torque of the electric motor. However, when the engine is in a low rotation area such as idle rotation, the control accuracy of the engine torque may not be obtained due to the high intake temperature of the engine, knocking of the engine, misfire of the engine, resonance of a power transmission member, etc., the actual engine torque may be insufficient for the required engine torque, that is, the torque deviation occurs, and the rotational speed of the electric motor may be reduced. In such a case, the rotation of the electric motor can be increased by reducing the negative torque of the electric motor, but there is a problem that the charge amount of the battery becomes insufficient. Further, when the engine torque is significantly reduced due to the above-described torque deviation, the negative torque of the electric motor is stuck to the negative torque upper limit value (limit value of the electric motor) of the rotation adjustment, so that the rotation is reduced, and the sufficient torque cannot be obtained from the low-rotation engine, and further, the battery charge amount becomes insufficient. In the control device for the hybrid electric vehicle described in JP 2009-029319 A, no consideration is given to the issue when the actual engine torque is insufficient with respect to the required engine torque.

The present disclosure has been made in view of the above circumstances, and an object of the present disclosure is to provide a charging control device for a hybrid electric vehicle capable of recovering a battery from an insufficient charge amount when the actual engine torque of the engine becomes insufficient.

The inventors have found that, as a result of various studies as the background of the above circumstances, charging of the battery can be suitably obtained by reducing the engine torque and obtaining the control accuracy of the engine torque, and controlling the engine torque such that the charge amount of the battery becomes a target charge amount, when the battery is charged because the remaining charge amount of the battery is reduced, and the actual engine torque is insufficient for the required engine torque. The present disclosure has been made based on such findings.

That is, in a control device for a hybrid electric vehicle according to the first aspect of the present disclosure, the hybrid electric vehicle includes an electric motor provided between an engine and a drive wheel, and a battery charged with electric power generated by the electric motor driven by the engine.

The control device includes an engine torque reduction control unit for reducing torque of the engine such that an operating point of the engine is within a predetermined engine torque stable region, when a remaining charge amount of the battery decreases to a predetermined value or less; and a charging control unit for controlling a rotational speed of the electric motor such that an actual charge amount by the electric motor becomes a predetermined target charge amount, in a state in which the operating point of the engine is set within the engine torque stable region by the engine torque reduction control unit.

With the control device for the hybrid electric vehicle according to the first aspect, when the remaining charge amount of the battery decreases to the predetermined value or less, the engine torque reduction control unit reduces the torque of the engine such that the operating point of the engine is within the predetermined engine torque stable region. Then, in a state in which the operating point of the engine is within the engine torque stable region, the torque of the electric motor is controlled by the charging control unit such that the actual charge amount by the electric motor becomes the predetermined target charge amount. This makes it possible to recover the battery from a state in which the charge amount is insufficient.

Here, preferably, in the control device according to the first aspect, the engine torque stable region may be a region obtained by excluding a region in which torque accuracy of the engine is not sufficiently obtained and the torque of the engine becomes unstable due to a high intake temperature of the engine, knocking of the engine, misfire of the engine, resonance of a power transmission member, etc. within two-dimensional coordinates of a rotational speed of the engine and the torque of the engine.

As described above, in the region in which the unstable region of the engine torque is excluded and the control accuracy of the engine torque is easily obtained, the engine torque is controlled such that the actual charge amount by the electric motor becomes the predetermined target charge amount, so that it is possible to recover the battery from the state in which the charge amount is insufficient.

Preferably, in the control device according to the first aspect, the engine torque reduction control unit may stop charging of the battery and cause the engine to operate autonomously in a case where rotation reduction of the engine continues even when the torque of the engine is reduced.

As a result, the engine is brought into an idle rotation state with no load.

Preferably, in the control device according to the first aspect, the control device may include an idle rotation learning control unit that learns the torque of the engine that maintains the target idle rotation of the engine when the engine is autonomously operated by the engine torque reduction control unit.

This eliminates deviation in the engine torque that maintains the target idle rotation of the engine.

Preferably, in the control device according to the first aspect, the charging control unit may execute rotational speed feedback control such that an actual rotational speed becomes a target value based on a predetermined target lower limit rotational speed in a state in which the hybrid electric vehicle is stopped.

Preferably, in the control device according to the first aspect, the target lower limit rotational speed may be a value on a boundary line of a region in which torque accuracy of the engine is not sufficiently obtained and the torque of the engine becomes unstable within two-dimensional coordinates of a rotational speed of the engine and the torque of the engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings.

Figure 1:
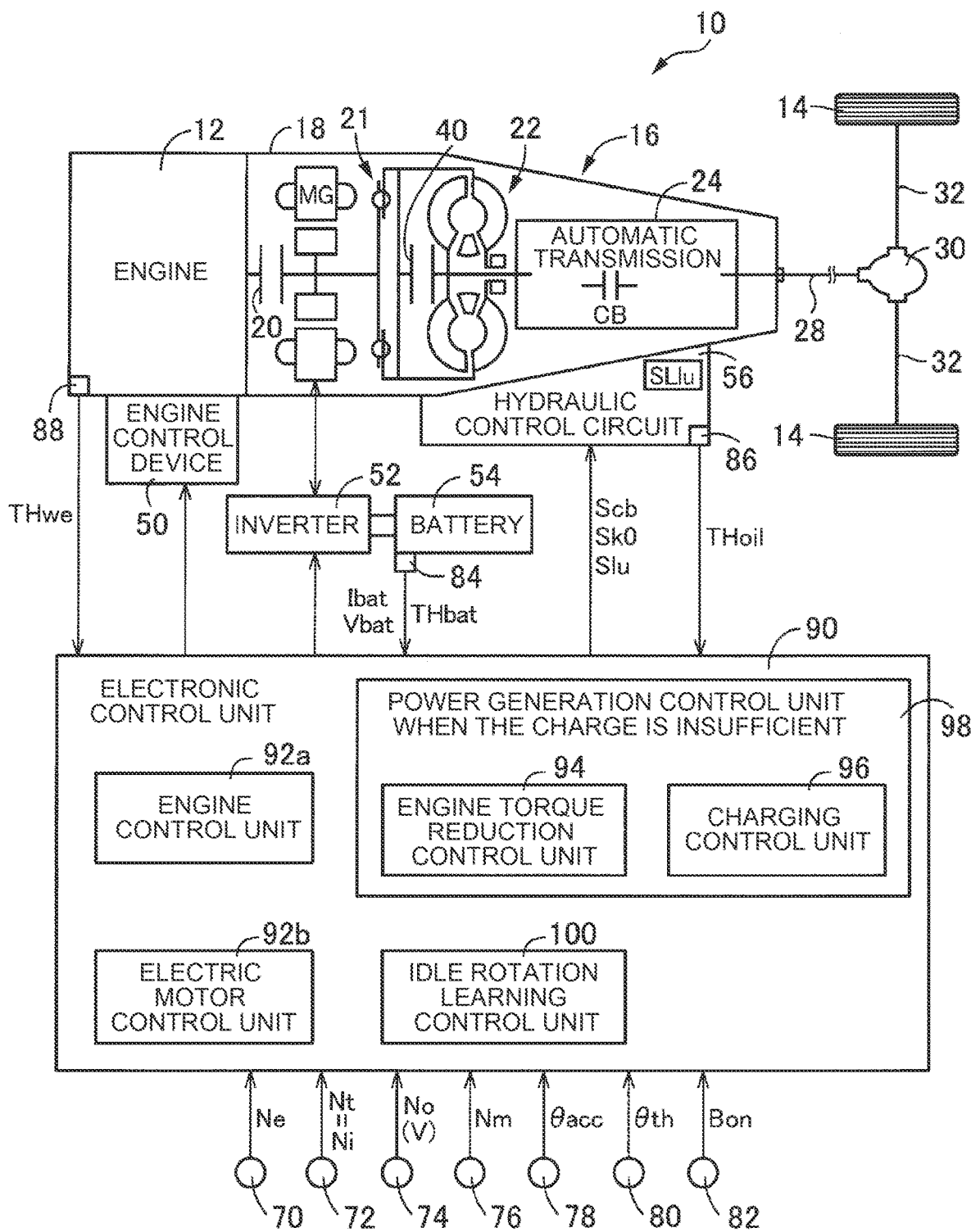
FIG. 1 is a diagram for explaining a hybrid electric vehicle and an electronic control unit to which the present disclosure is applied, and a diagram for explaining a main part of a control function of a control device.

FIG. 1 is a diagram for describing a schematic configuration of a hybrid electric vehicle (hereinafter referred to as a vehicle) 10 to which the present disclosure is applied, and is a diagram for describing main parts of a control function and a control system for various kinds of control in the vehicle 10. In FIG. 1, a vehicle 10 includes an engine 12 that functions as a power source and an electric motor MG. Vehicle 10 also includes an electric motor MG in a power transmission path 16 between engine 12 and drive wheels 14.

In the engine 12, the engine control device 50 is controlled by an electronic control unit 90, which will be described later, to control the rotational speed Ne (rpm) and the engine torque Te (Nm) of the engine 12.

The electric motor MG is a rotating electric machine having a function as a motor and a function as a generator that generates electric power, and is a so-called motor generator. The electric motor MG is connected to the battery 54 via the inverters 52. The battery 54 is a power storage device that transmits and receives electric power to and from the electric motor MG. In the electric motor MG, the inverter 52 is controlled by the electronic control unit 90, so that the output torque Tm which is the positive torque of the electric motor MG and the power generation (regeneration) torque −Tm which is the negative torque are controlled.

The power transmission path 16 includes, in the case 18, a K0 clutch 20 provided between the engine 12 and the electric motor MG, a pulsation absorbing damper 21 that absorbs pulsation of torque while transmitting power, a torque converter 22 with a LU clutch 40, and an automatic transmission 24.

Outside the case 18, the power transmission path 16 includes a propeller shaft 28 connected to a transmission output shaft 26 which is an output rotation member of the automatic transmission 24, a differential gear 30 connected to the propeller shaft 28, a pair of drive shafts 32 connected to the differential gear 30, and the like.

The automatic transmission 24 is a known planetary gear type automatic transmission including, for example, one or a plurality of sets of planetary gears (not shown) and an engagement device CB. The engagement device CB includes, for example, a plurality of known hydraulic frictional engagement devices. The automatic transmission 24 is a stepped transmission in which any one of a plurality of gear stages (also referred to as gear stages) having different gear ratio (also referred to as gear ratio) γat (=AT input-speed Ni/AT output-speed No) is formed by engagement of any one of the engagement devices in the engagement device CB. In the automatic transmission 24, a gear stage formed in accordance with an accelerator operation of a driver (=driver), a vehicle speed V, and the like is switched by an electronic control unit 90 described later. MG rotational speed Nm is equal to the rotational speed Ne of the engine 12 in the engaged state of K0 clutch 20, and is equal to the input rotational speed and AT input rotational speed Ni of the torque converter 22 in the engaged state of LU clutch 40.

The vehicle 10 includes an electronic control unit 90. The electronic control unit 90 includes, for example, a so-called microcomputer including a CPU, RAM, ROM, an input/output interface, and the like, and CPU performs various controls of the vehicles 10 by performing signal-processing in accordance with a program stored in ROM in advance while using a temporary storage function of RAM. The electronic control unit 90 includes computers for engine control, electric motor control, clutch control, transmission control, and the like as necessary.

The electronic control unit 90 is supplied with various types of signals and the like based on detected values by various sensors (for example, the engine rotation speed sensor 70, the turbine rotation speed sensor 72, the output rotation speed sensor 74, MG rotation speed sensor 76, the accelerator opening degree sensor 78, the throttle valve opening degree sensor 80, the brake switch 82, the battery sensor 84, the oil temperature sensor 86, the water temperature sensor 88, and the like) provided in the vehicle 10. For example, a turbine rotational speed Nt which is the same value as the engine rotational speed Ne, AT input rotational speed Ni which is the rotational speed of the engine 12, an AT output rotational speed No corresponding to the vehicle speed V, an MG rotational speed Nm which is the rotational speed of the electric motor MG, an accelerator operation amount θacc which is the accelerator operation amount of the driver indicating the magnitude of the acceleration operation of the driver, a throttle valve opening degree θth which is the opening degree of the electronic throttle valve, a brake on signal Bon which is a signal indicating a state in which the brake pedal for operating the wheel brake is operated by the driver, a battery temperature THbat of the battery 54, a battery charge/discharge current Ibat, a battery voltage Vbat, a hydraulic oil temperature THoil which is the temperature of the hydraulic oil in the hydraulic control circuit 56, a coolant temperature THwe of the engine 12, and the like are supplied.

Various command signals are output from the electronic control unit 90 to each device (for example, the engine control device 50, the inverter 52, the hydraulic control circuit 56, and the like) provided in the vehicle 10. For example, an engine control command signal Se for controlling the engine 12, an MG control command signal Sm for controlling the electric motor MG, a CB hydraulic control command signal Scb for controlling the engagement device CB, K0 hydraulic control command signal Sko for controlling the K0 clutch 20, LU hydraulic control command signal Slu for controlling the LU clutch 40, and the like are outputted.

The electronic control unit 90 includes a power generation control unit 98 when a charge is insufficient, which includes an engine control unit 92*a*, an electric motor control unit 92*b*, an engine torque reduction control unit 94, and a charging control unit 96, in order to realize various controls in the vehicle 10.

The electronic control unit 90 functions as a hybrid control unit that executes hybrid drive control by the engine 12 and the electric motor MG and the like by the function of the engine control unit 92*a* and the function of the electric motor control unit 92*b* that controls the operation of the electric motor MG via the inverter 52. In the hybrid drive control, the drive of the vehicle 10 is mainly controlled so that sufficient acceleration performance can be obtained with the fuel consumption as low as possible.

The electronic control unit 90 calculates the drive request amount for the vehicle 10 by the driver by applying the accelerator operation amount θ acc and the vehicle speed V to the drive request amount map, for example. The drive requirement is, for example, the required drive torque Trdem [Nm] in the drive wheels 14. The required driving torque Trdem [Nm] is the required driving power Prdem [W] at the vehicle speed V at that time. In order to realize the required driving power Prdem, the engine control unit 92*a* outputs an engine control command signal Se for controlling the engine 12, and the electric motor control unit 92*b* outputs an MG control command signal Sm for controlling the electric motor MG. When the accelerator operation amount θ acc is zero, the engine control unit 92*a* performs idle rotation control for autonomously rotating the engine 12 so as to achieve the target idle rotation speed. The target idle rotational speed is increased by the warm-up state of the engine 12 and the like, with the target lower limit rotational speed being the basic value, that is, the lower limit value.

When the required driving torque Trdem can be provided only by outputting the electric motor MG, the electronic control unit 90 establishes the motor driving mode, that is, BEV driving mode, as the driving mode for driving the vehicles 10. On the other hand, when the required drive torque Trdem cannot be satisfied without using at least the power of the engine 12, the electronic control unit 90 establishes the engine drive mode, that is, HEV drive mode, as the drive mode. HEV driving mode is a hybrid driving mode in which, in the engaged condition of K0 clutch 20, at least the engine 12 is used as a power source SP and the engine travels, that is, the hybrid travels (HEV travels). On the other hand, the electronic control unit 90 establishes HEV drive mode as the drive mode even when the required drive torque Trdem can be provided only by outputting the electric motor MG, when the battery 54 needs to be charged, when the engine 12 needs to be warmed up, or when the hydraulic oil temperature THoil is at a very low temperature.

Figure 2:
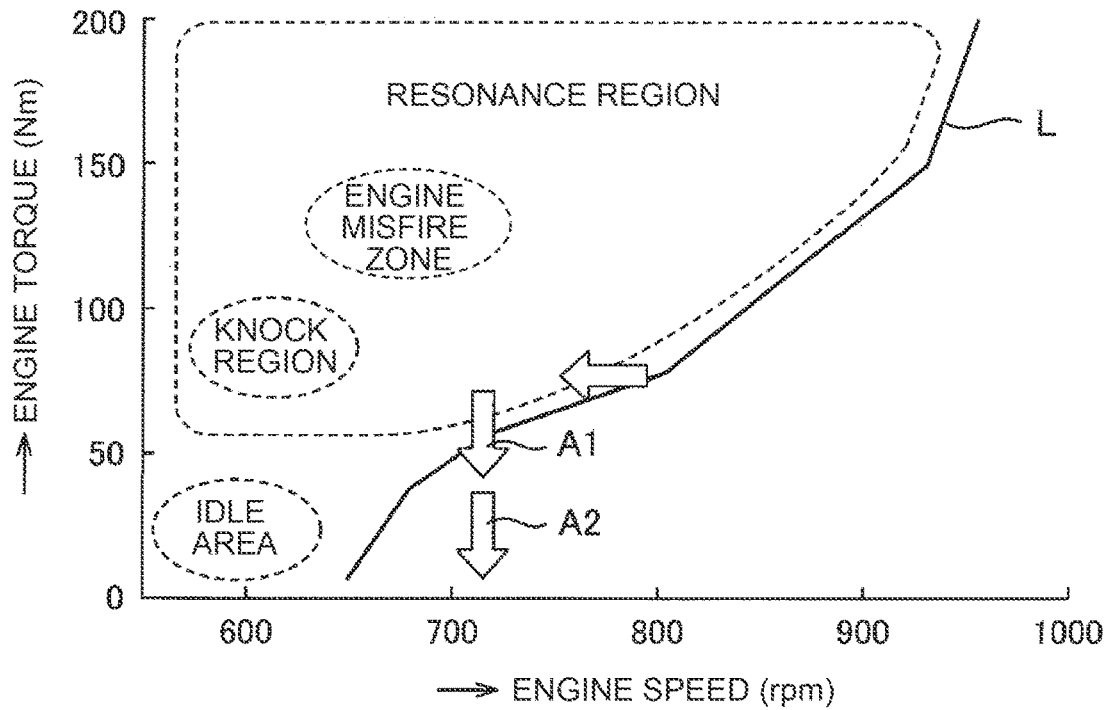
FIG. 2 is a diagram illustrating a boundary line between a region where the torque accuracy of the engine is not stable and a region where the torque accuracy of the engine is stable in the two-dimensional coordinates of the rotational speed of the engine and the torque of the engine.

When the battery 54 needs to be charged, K0 clutch 20 is engaged, the electric motor MG is rotationally driven by the engine 12, and the output current (negative torque) of the electric motor MG is controlled so as to obtain a target charge amount based on the generated electric power of the electric motor MG, so that the battery 54 is charged. That is, in such a state-of-charge, the positive torque of the engine 12 and the negative torque of the electric motor MG are balanced, so that the electric motor MG is maintained rotating and the battery 54 is charged. However, in a relatively low-speed range, such as when the vehicle 10 stops or runs at a low-speed coast, for example, where the accelerator operation amount of θ acc is zero and the engine 12 is idle, for example, in a relatively low-speed range below 950 rpm, there is an area, such as shown in FIG. 2, in which the intake temperature of the engine 12 is high, the knocking of the engine 12, the misfire of the engine 12, and the oscillation of the pulsation absorbing damper 21 cause the engine 12 to become unstable, resulting in a shortage of the actual torque of the engine 12 with respect to the requested engine torque, which reduces the rotation of the electric motor MG. In such cases, the electric motor can be rotated up by decreasing the negative torque of the electric motor MG, but the battery 54 is insufficiently charged. On the other hand, when an attempt is made to increase the negative torque of the electric motor MG in order to secure the charge amount of the battery 54, the rotation of the engine 12 connected to the electric motor MG decreases, and a sufficient torque cannot be obtained from the low-rotation engine 12, and the charge amount of the battery 54 is insufficient.

For example, in the low-rotation region of the engine 12 below 950 rpm as shown in FIG. 2, in the two-dimensional coordinates of the horizontal axis indicating the engine rotational speed Ne and the vertical axis indicating the engine torque Te, a decrease region of the engine torque derived from the idle rotation of the engine 12 in which the combustion of the engine 12 is low, the optimum ignition timing MBT torque becomes flat, and the matching value is easily displaced when the rotation is low, a decrease region of the engine torque due to a decrease in the accuracy of the optimum ignition timing MBT due to the knocking of the engine 12, a decrease region of the engine torque resulting from the misfire of the engine 12, and a decrease region of the engine torque resulting from the rotation variation due to the resonance of the pulsation absorbing damper 21 are respectively shown. These regions are regions in which the torque accuracy of the engine 12 is not obtained with respect to the required engine torque (required output), and the actual torque of the engine 12 is likely to be insufficient. The line L in FIG. 2 is a characteristic line in which the rotational speed of the engine 12 rises from the vicinity of 650 rpm and the engine torque Te increases as the rotational speed Ne of the engine 12 increases, and shows a borderline between the engine torque unstable region TU in which the torque of the engine 12 is unstable and the torque accuracy is low and the engine torque stable region TS in which the torque of the engine 12 is stable and the torque accuracy is high. In the present embodiment, the line L indicates the target lower limit rotational speed NeTs-α of the engine 12 after the engine 12 has been changed after the operating point of the engine is moved to the engine torque stable region TS. α is a value from 0 to several tens of rpm, and is a margin value. That is, the target lower limit rotational speed NeTs of the engine 12 is a value on the line L or a value along the line L.

On the other hand, in the present embodiment, when the remaining charge amount SOC of the battery 54 decreases due to the insufficient torque of the engine 12 in a low-rotation region in which the rotational speed Ne of the engine 12 is, for example, a 950 rpm or less, as shown in an arrow A1, A2 in FIG. 2, a power generation control unit 98 is provided that maintains the target charge amount of the battery 54 while reducing the torque Te of the engine 12 and setting the operating point of the engine 12 to the engine torque stable region TS in which the torque of the engine 12 is stable.

The engine torque reduction control unit 94 of the engine during insufficient charging power generation control unit 98, the vehicle 10 stops, the revolution of the engine 12 is reduced to a low 950 rpm or less, and the remaining charge amount SOC of the battery 54 is reduced to a predetermined value, for example, the first determination value SOC1 for determining that SOC is reduced to a level below the normal usage range and is considered to be poor, the operation point of the engine 12 after prohibiting the energy management priority process that had been executed until then, as indicated by the arrow A1 in FIG. 2, as a predetermined position within the engine torque stable region TS from the engine torque unstable region TU of FIG. 2, the Torque of the engine 12 is temporarily lowered by a predetermined value from the target Torque Tit that had been used until then to the target Torque Tit1. At the same time, the target charge amount of the battery 54 is reduced, and the actual charge amount of the battery 54 is reduced. The predetermined value is a value at which the operating point of the engine 12 is sufficiently lower than the line L. In addition, the above-described energy management prioritization process is a process of increasing the generated current of the electric motor MG by increasing the rotational speed of the engine 12 so that the actual charge amount of the battery 54 follows the target charge amount when the torque of the engine 12 is insufficient with respect to the charge of the battery 54.

Even if the engine torque reduction control unit 94 prohibits the above-described energy management prioritization process and lowers the torque of the engine 12 to reduce the actual charge amount of the battery 54, if the rotation speed of the engine 12 continues to decrease, the torque of the engine 12 is further lowered as shown by the arrow A2 in FIG. 2 so that the charge of the battery 54 is stopped and the negative torque of the electric motor MG is set to zero, and the engine 12 is brought into an autonomous operation state in which the output torque is zero, that is, an idle rotation state.

The charging control unit 96, while the operating point of the engine 12 is within the engine torque stable region TS by the engine torque reduction control unit 94, the vehicle 10 is stopped, the engine 12 rotational speed is reduced to a low rotational speed of 950 rpm or less, and the battery 54 remaining charge amount SOC is reduced to a predetermined value, for example, the first determination value SOC1 for determining that SOC is reduced to lower than or equal to the lower torque defect around the normal use range If any one is denied, the energy management priority process is permitted, and by increasing the rotational speed and torque of the engine 12, the actual charging amount of the battery 54 is increased. Accordingly, the remaining charge amount SOC of the battery 54 is also increased. The arrow A3 in FIG. 3 indicates the rotational speed of the engine 12 and the moving direction of the operating point of the engine 12 due to the increased torque.

In addition, when the operating point of the engine 12 is within the engine torque stable region TS, the charging control unit 96 executes the rotational speed feedback control so that the actual rotational speed Ne of the engine 12 or the actual rotational speed Nmg of the electric motor MG becomes the predetermined target lower limit rotational speed Nit When the engine torque reduction control unit 94 prohibits the energy management prioritization process and continues to reduce the rotational speed of the engine 12, the idle rotation learning control unit 100 executes learning control in which, when the engine 12 is brought into an autonomous operation state in which the output torque is zero, that is, an idle rotation state, in a subsequent ISC control in which the rotational speed of the engine 12 is set to a preset target value, the engine torque that maintains the idle rotation at that time is set to the target torque at the time of the idle control of the engine 12. This eliminates the deviation of the torque of the engine 12 and the decrease in the rotation of the engine 12 during idling.

Figure 4:
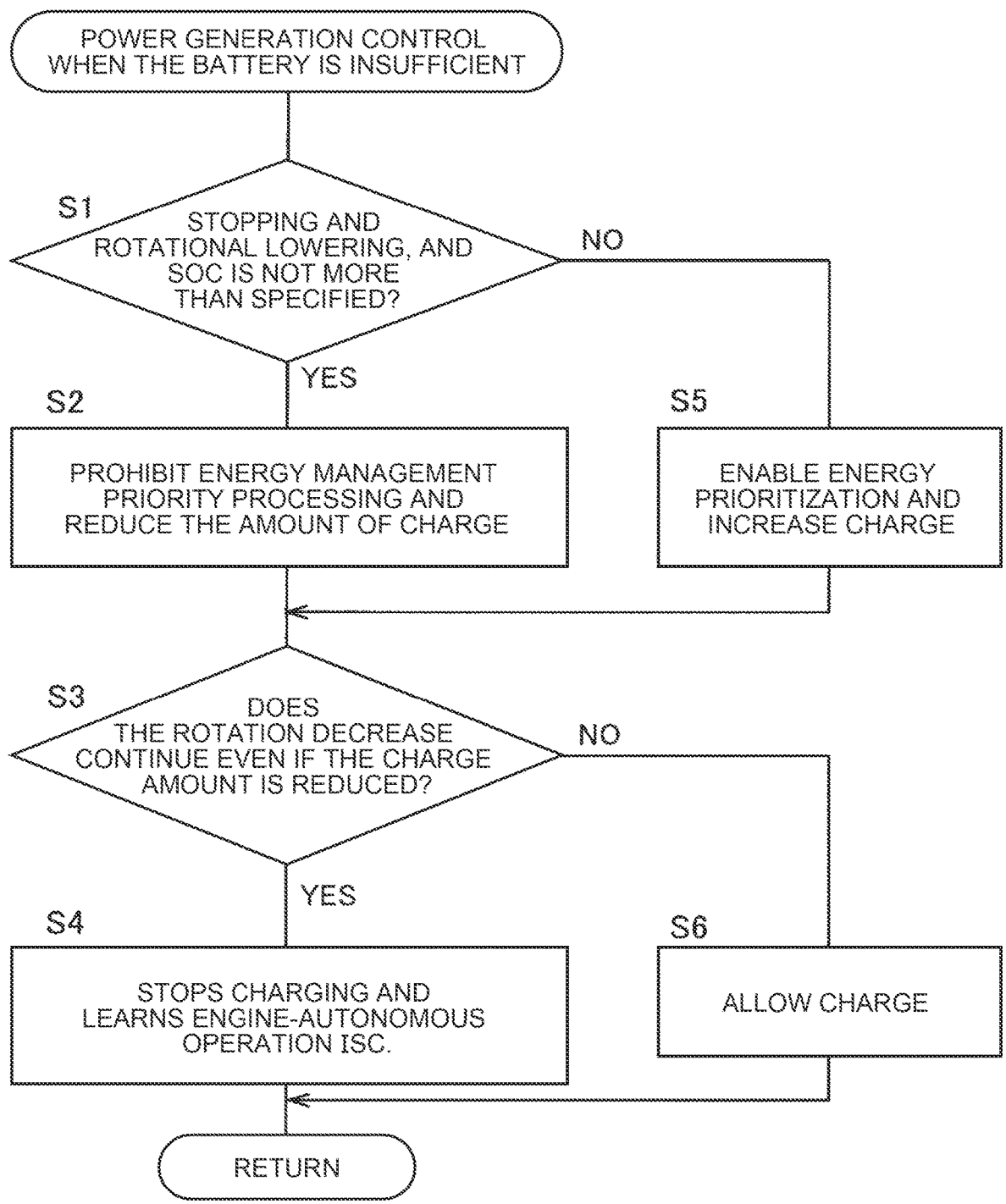
FIG. 4 is a flow chart describing the main part of the control function of the electronic control unit of FIG. 1.
Figure 5:
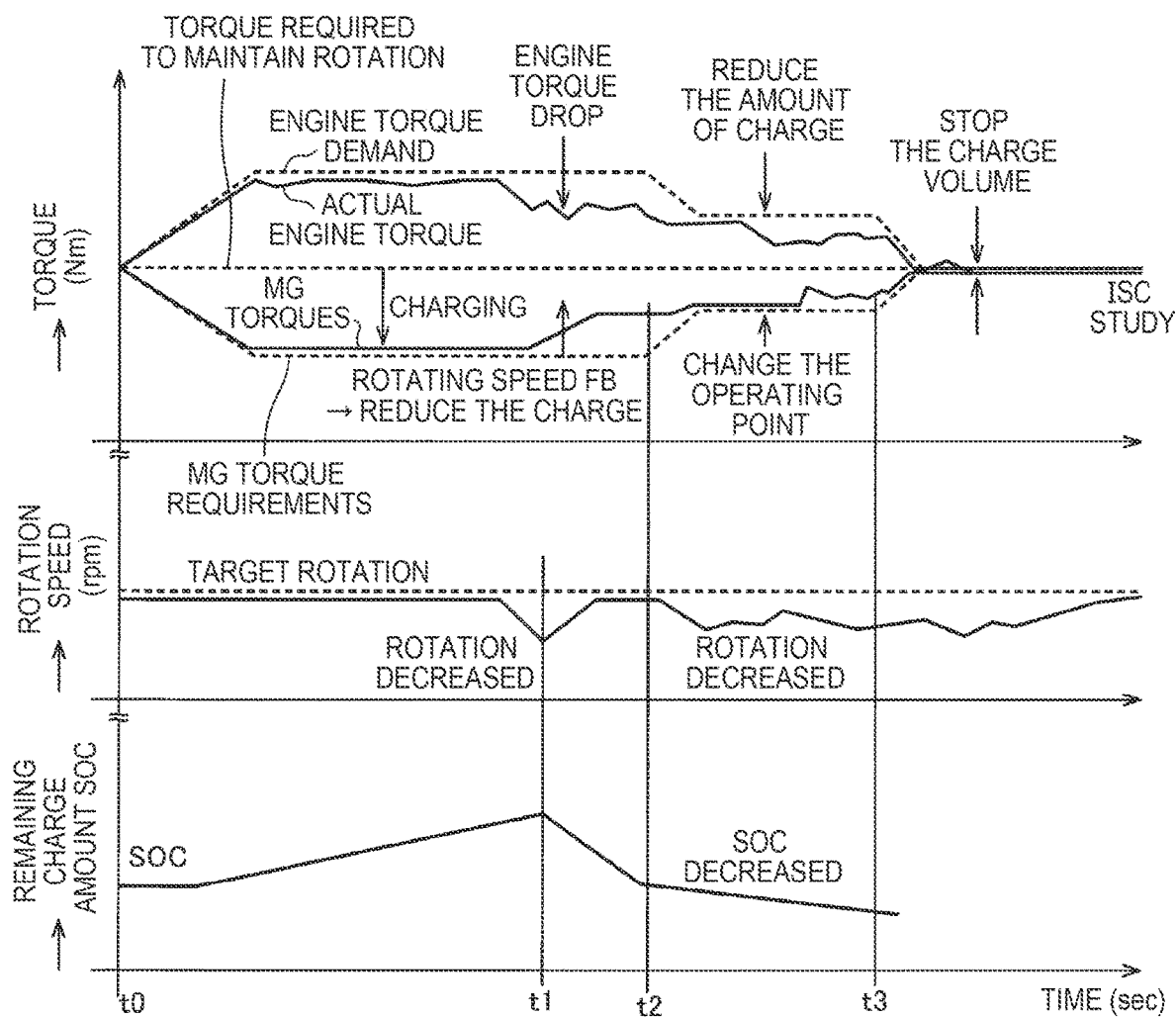
FIG. 5 is a time diagram illustrating a main part of a control operation of the electronic control unit of FIG. 1.

FIG. 4 is a flowchart for describing a main part of a control operation of the power generation control at the time of insufficient charge of the electronic control unit 90, and FIG. 5 is a time chart for describing a main part of a control operation of the power generation control at the time of insufficient charge of the electronic control unit 90. In S1 of FIG. 4 (hereinafter, steps will be omitted), S2, S4, S5 corresponds to the control function of the engine torque reduction control unit 94, and S3, S6 corresponds to the control function of the charging control unit 96.

Figure 3:
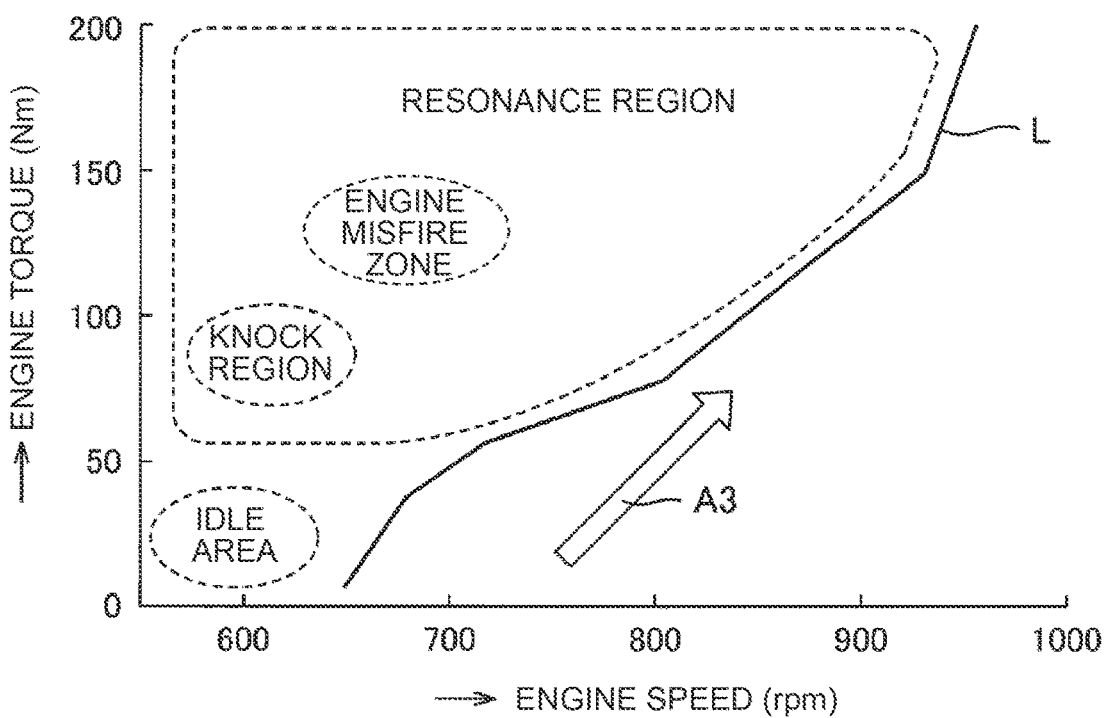
FIG. 3 is a diagram illustrating a direction in which an operating point of an engine is moved within a region where the torque accuracy of the engine is stable in the two-dimensional coordinates of the engine speed and the engine torque, and the deviation of the actual torque with respect to the required engine torque is reduced, and then the engine is rotated and raised during the charging of the battery.

In S1 of FIG. 3, it is determined whether or not the vehicle 10 has stopped, the rotational speed of the engine 12 has decreased, and the remaining charge amount SOC of the battery 54 has decreased to a predetermined value or less, for example, to a predetermined first determination value SOC1 or less. When the determination of S1 is negative, the energy management prioritization process is permitted in S5, and the charge of the battery 54 is increased. For example, a section from to time point to t1 time point in FIG. 5 indicates this condition. In this section, the rotational speed feedback control is executed when the actual rotational speed Ne of the engine 12 or the actual rotational speed Nmg of the electric motor MG is set to a predetermined target lower limit rotational speed NeTs.

When the determination of S1 is negative, the engine 12 is maintained at a relatively high rotational speed while the vehicle 10 is traveling, and the remaining charge amount SOC of the battery 54 is larger than a predetermined value, for example, a predetermined first determination value SOC1, so that the engine 12 is permitted to perform an energy management prioritization process for increasing fuel efficiency as an operating point of a low rotational high torque, and the power generation amount of the electric motor MG is relatively increased. However, when the determination of S1 is affirmative, in S2, the energy management prioritizing process for increasing the fuel efficiency is prohibited with the engine 12 as the operating point of the low-rotation-high torque, and the required torque of the electric motor MG is reduced, so that the power generation quantity (charge quantity) of the electric motor MG is relatively lowered. t2 point in FIG. 5 indicates this condition. As a result, the rotational speed of the engine 12 is maintained at the target rotational speed.

In the following S3, even if the energy management prioritization process is prohibited and the power generation amount of the electric motor MG is relatively lowered while the vehicle 10 is stopped, the rotational speed of the engine 12 is reduced, and the remaining charge amount SOC of the battery 54 is reduced to a predetermined value or less, for example, to a predetermined first determination value SOC1 or less, it is determined whether or not the reduction in the rotational speed of the engine 12 is continued.

If the determination of S3 is negative, the battery 54 is permitted to be charged by the electric motor MG in S6. Further, the rotational speed feedback control is executed when the actual rotational speed Ne of the engine 12 or the actual rotational speed Nmg of the electric motor MG is set to a predetermined target lower limit rotational speed NeTs.

However, when the determination of S3 is affirmative, in S4, the electric motor MG stops charging the battery 54, and the engine 12 is autonomously operated. t3 point in FIG. 4 indicates this condition. During the autonomous operation of the engine 12. a learn control is executed in which the torque of the engine 12 that maintains the idle speed is set to the target engine torque by the subsequent ISC control.

As described above, according to the electronic control unit 90 of the present embodiment, when the remaining charge amount SOC of the battery 54 decreases to a predetermined value or less, the engine torque reduction control unit 94 reduces the torque of the engine 12 such that the operating point of the engine 12 falls within a predetermined engine torque stable region TS. Then, while the operating point of the engine 12 is within the engine torque stable region TS, the charging control unit 96 controls the torque of the electric motor MG so that the actual charge amount by the electric motor MG becomes a preset target charge amount. This makes it possible to recover the battery 54 from a state in which the amount of charge is insufficient.

Further, according to the electronic control unit 90 of the present embodiment, the engine torque stable region TS is an area in which, within the two-dimensional coordinates of the rotational speed of the engine 12 and the torque of the engine 12, the intake air temperature of the engine 12 is high, the knocking of the engine 12, the misfire of the engine 12, the torque accuracy of the engine 12 is not sufficiently obtained due to such resonances of the pulsation absorbing damper 21 of the power transmission system, and the torque of the engine 12 becomes unstable except the engine torque unstable region TU. As described above, the engine torque unstable region TU in which the torque of the engine 12 is unstable is eliminated, and the torque of the electric motor MG is controlled so that the actual charge amount by the electric motor MG becomes a preset target charge amount in the engine torque stable region TS in which the torque control accuracy of the engine 12 is easily generated, so that the battery 54 can be easily recovered from a condition in which the charge amount is insufficient.

Further, according to the electronic control unit 90 of the present embodiment, when the rotation decrease of the engine 12 continues even if the torque of the engine 12 is reduced, the engine torque reduction control unit 94 stops the charging of the battery 54 and causes the engine 12 to operate autonomously. As a result, the engine 12 is brought into an idle rotation state with no load. Thus, the rotation of the engine 12 is stably continued.

Further, according to the electronic control unit 90 of the present embodiment, when the engine 12 is operated autonomously by the engine torque reduction control unit 94, an idle rotation learning control unit that learns the torque of the engine 12 during the autonomous operation of the engine 12 as the target torque of the engine 12 of the subsequent target idle rotation control is included. Thus, the deviation of the torque of the engine 12 during the idle rotation control is determined to be eliminated.

Further, according to the electronic control unit 90 of the present embodiment, the charging control unit 96 performs the rotational speed feedback control so that the actual rotation speed of the electric motor MG becomes a target value based on a predetermined target lower limit rotation speed in the stopped condition of the vehicle 10. As a result, the rotational speeds of the engine 12 and the electric motor MG are stably maintained, so that the battery 54 can be easily recovered from a condition in which the charge is insufficient.

Further, according to the electronic control unit 90 of the present embodiment, the value on the boundary line (line L) between the engine torque unstable region TU in which the torque of the engine 12 is unstable and the engine torque stable region TS in which the torque of the engine 12 is stable is a value along the boundary line (line L) or a value along the boundary line thereof, in which the torque accuracy of the engine is not sufficiently obtained within the two-dimensional coordinates of the rotational speed of the engine 12 and the torque of the engine 12. Accordingly, since the rotational speed of the electric motor MG is controlled so that the actual charge amount of the battery 54 becomes a preset target charge amount in an area where the torque of the engine 12 is unstable is eliminated and the torque control accuracy of the engine 12 is easily obtained, the battery 54 can be easily recovered from a condition where the charge amount is insufficient.

Although the embodiments of the present disclosure have been described in detail with reference to the drawings, the present disclosure is also applied to other aspects.

For example, in the above-described embodiment, the torque converter 22 is provided in the power transmission path 15 of the vehicle 10, but the starting clutch may be provided instead of the torque converter 22.

Further, in the above-described embodiment, as shown in FIG. 5, the engine torque request and MG torque request are changed at a predetermined inclination, but may be changed stepwise.

It should be noted that the above-described embodiment is merely one embodiment, and the present disclosure can be implemented in a manner in which various modifications and improvements are made based on the knowledge of a person skilled in the art.

What is claimed is:

1. A control device of a hybrid electric vehicle, the vehicle including an engine, an electric motor connected to a power transmission path between the engine and a drive wheel so as to be configured to transmit power, and a battery configured to be charged with electric power generated by the electric motor driven by the engine, the control device comprising:

an engine control unit configured to output an engine control command signal controlling the engine;

an electric motor control unit configured to output an electric motor control command signal controlling the electric motor;

an engine torque reduction control unit configured to reduce torque of the engine such that an operating point of the engine is within a predetermined engine torque stable region, in a case where a remaining charge amount of the battery decreases to a predetermined value or less; and a charging control unit configured to control a rotational speed of the electric motor such that an actual charge amount by the electric motor becomes a predetermined target charge amount, in a state in which the operating point of the engine is set within the predetermined engine torque stable region by the engine torque reduction control unit.

2. The control device according to claim 1, wherein the predetermined engine torque stable region is a region obtained by excluding a region in which torque accuracy of the engine is not sufficiently obtained and the torque of the engine becomes unstable within two-dimensional coordinates of a rotational speed of the engine and the torque of the engine.

3. The control device according to claim 1, wherein the engine torque reduction control unit is configured to stop charging of the battery and cause the engine to operate autonomously in a case where rotation reduction of the engine continues even when the torque of the engine is reduced.

4. The control device according to claim 3, further comprising an idle rotation learning control unit configured to learn, as target torque of the engine when idle rotation is controlled, the torque of the engine in a case where the engine is autonomously operated by the engine torque reduction control unit.

5. The control device according to claim 1, wherein the charging control unit is configured to execute rotational speed feedback control of the electric motor such that an actual rotational speed becomes a target value based on a predetermined target lower limit rotational speed in a state in which the hybrid electric vehicle is stopped.

6. The control device according to claim 5, wherein the target lower limit rotational speed is a value along a boundary line or on a boundary line of a region in which torque accuracy of the engine is not sufficiently obtained and the torque of the engine becomes unstable within two-dimensional coordinates of a rotational speed of the engine and the torque of the engine.

7. A control device of a hybrid electric vehicle, the vehicle including an engine, an electric motor connected to a power transmission path between the engine and a drive wheel so as to be configured to transmit power, and a battery configured to be charge with electric power generated by the electric motor driven by the engine, the control device comprising a processor, the processor configured to:

control at least one of the engine and the electric motor to drive the vehicle, in a case where a remaining charge amount of the battery is greater than a predetermined value;

reduce torque of the engine such that an operating point of the engine is within a predetermined engine torque stable region, in a case where a remaining charge amount of the battery decreases to the predetermined value or less; and control a rotational speed of the electric motor such that an actual charge amount by the electric motor becomes a predetermined target charge amount, in a state in which the operating point of the engine is set within the predetermined engine torque stable region.

* * * * *